May 11, 1965 A. M. MIDIS ETAL 3,183,498

LINE-MONITOR CIRCUIT

Filed Oct. 2, 1961

INVENTOR.
A. M. MIDIS
W. C. HOWE

BY

ATTORNEY

United States Patent Office 3,183,498
Patented May 11, 1965

3,183,498

LINE-MONITOR CIRCUIT

Anthony M. Midis and Wilfred C. Howe, both of Chicago, Ill., assignors to International Telephone and Telegraph Corporation, New York, N.Y., a corporation of Maryland Filed Oct. 2, 1961, Ser. No. 142,150
4 Claims. (Cl. 340—253)

Figure 1:
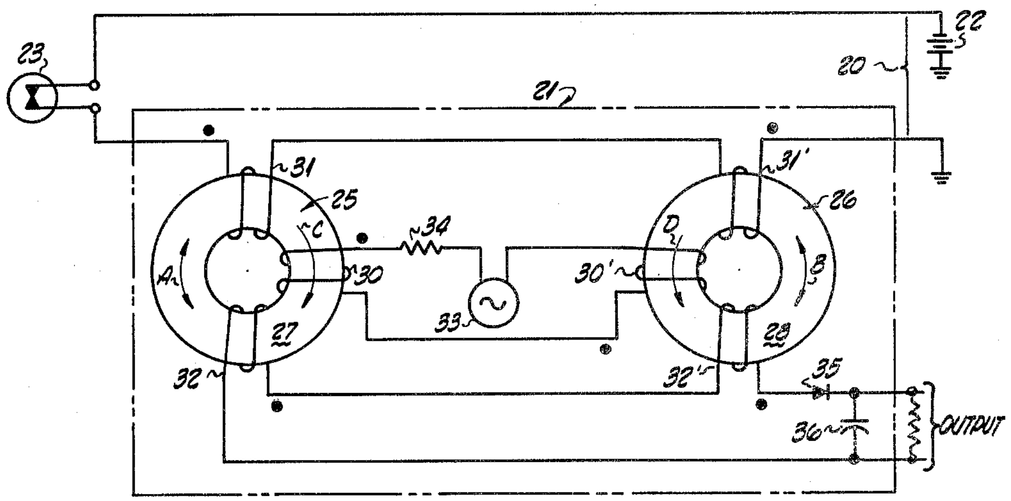

This invention relates to line-monitor circuits, and more particularly to circuits for detecting current changes appearing on D.C. line.

In many electrical code signalling systems, information is sent in the form of D.C. potentials and/or currents selectively applied to and removed from a wire line. A few of the better known systems of the type described include telegraph systems and telephone dial systems. For example, telephone dials and hook switch contacts actuate a circuit to send D.C. signals. Normally, D.C. currents are transmitted over a line either in the form of digital signals or as a solid D.C. marking current.

Occasionally, circuits are connected to the wire between its end points so that the line may be monitored. These circuits may test a line for proper operation, monitor messages transmitted over the line, or provide switching supervision. In the past, these circuits have caused very serious deterioration of the messages transmitted over the monitored wire line. For example, these line monitoring circuits included the winding of a relay which introduced appreciable losses in the line because of the power required to operate the relay. Also, the winding inductance tended to distort pulse shape and garble the transmitted information. When attempts were made to substitute electronic switches for the relays, it was necessary to provide complex biasing circuits because the line potentials varied greatly. For example, monitor circuits must operate from the potentials on long lines, short lines, new lines, old lines, lines with insulation faults, lines with stray foreign potential, lines with wet weather faults, and the like.

Accordingly, an object of this invention is to provide new and improved line-monitoring circuits. More particularly, an object is to provide line-monitoring circuits which do not interfere with the transmission of messages over the monitored line. A more specific object is to provide monitoring circuits which are electrically isolated from the line. Yet another object of this invention is to provide line-monitoring circuits having universal application to all lines in a signalling system without regard to variations in the potentials appearing on the lines. Still another object is to provide monitoring circuits that can withstand line transients and that can be more sensitive than presently available circuits.

In accordance with one aspect of this invention, a monitored circuit includes a wire line having pulsing contacts at one end and a D.C. source at the other end. Thus, make and break pulse signals may be sent over the line by opening and closing the pulsing contacts. The monitoring circuit includes a current sensing element, here shown as a saturable reactor, inductively coupled in series with the line at the monitoring point. For a brief instant after the pulsing contacts open or close, the core flux of the saturable reactor changes and the impedance of a winding on the series connected reactor increases. However, this increased impedance is fleeting and almost without effect on the line current. After the reactor saturates, the impedance of the winding in series with the line drops virtually to zero and has no appreciable effect on line potentials. Bucking currents induced in the series winding minimize the small effect that does remain. In this manner the changes in the core flux caused by the line current induces signals in the A.C. windings on the core to indicate the appearance or removal of D.C. currents on the line.

Figure 2:
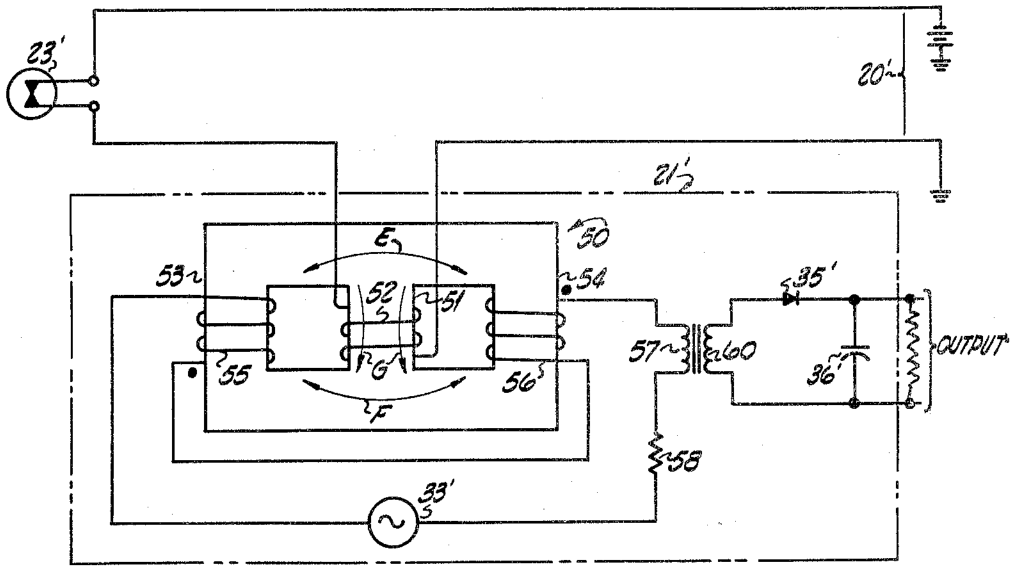

The above mentioned and other features and objects of this invention and the manner of obtaining them will become more apparent, and the invention itself will be best understood by making reference to the following description of two embodiments of the invention taken in conjunction with the accompanying drawing wherein:

FIG. 1 shows by schematic circuit diagram a monitoring circuit utilizing a pair of saturable reactors; and FIG. 2 shows by schematic circuit diagram a monitoring circuit utilizing a multi-leg core saturable reactor.

Briefly, FIG. 1 shows a line-monitor circuit comprising a monitored line 20 and a current sensing element 21 for detecting current changes on the line. The monitored line has a D.C. source 22 connected across one end and a pulsing contact 23 connected across the other end. When the pulsing contacts close, current flows over the line; when the pulsing contacts open, the current terminates. If the pulsing contacts open and close during irregular or indefinite periods, the signals are described as "mark signals." On the other hand, if the contacts open and close during fixed intervals, the signals are called "pulse signals."

The current sensing element of FIG. 1 includes a pair of saturable core devices 25, 26. Each device includes an annular core 27, 28. While the magnetic characteristics of these cores are not critical, square hysteresis loop cores are preferred since they are readily available with a great variety of precise magnetic characteristics. On each core are matched primary, control, and secondary windings (30, 31, 32 and 30′, 31′, 32′ respectively). As the term "matched" implies, corresponding windings produce similar magnetic effects. Inked dots indicate the directions in which the winding turns are wound. That is, current flowing in a given direction into the dotted end of any winding always produces a magnetic effect tending to drive the core toward saturation in a first magnetic direction. If the direction of current flow is reversed, the core is driven toward magnetic saturation in an opposite magnetic direction.

From the position of these dots, it is apparent that the two control windings 31, 31′ are series "bucking" connected in the line. As will become more apparent voltages induced in these windings "buck" out on the line. The primary windings 30, 30′ are also connected in a series "bucking" circuit. Again, as will become more apparent, voltages in windings 30, 30′ produce the same magnetic effect. It is only important, however, that the control windings be magnetically opposing relative to the primary windings.

The remaining components of the primary circuit are a bi-polar pulse source 33 and a resistor 34. The pulse source has alternately positive going and negative going half cycles having substantially equal energy content. The wave shape of these half-cycles is not essential to the invention. Conveniently, the pulse source 33 may be 60 c.p.s. commercial power, or any other available A.C. source. The resistor 34 and the primary windings 30, 30′ form a variable voltage divider (i.e., most of the source voltage appears across the primary windings when the cores have high effective permeability and across the resistor when the cores have low effective permeability). Also, the resistor limits current in the primary windings when the cores are in the latter condition.

The output circuit includes the two secondary windings 32, 32′ connected with magnetic polarities corresponding to the magnetic polarities of the primary windings 30, 30′. Thus, the secondary or output windings are series aiding when voltages are induced therein by energization of the primary windings from source 33. Finally, the output circuit preferably includes a rectifier 35 and a smoothing filter, here shown as a large capacitor 36 connected across the output terminals to produce a D.C. output.

The circuit of FIG. 1 operates this way. First, assume that the pulsing contacts 23 are open so that no current flows over the line 20. Since current does not flow in the control windings 31, 31′, they exercise no control over the magnetic flux in the annular cores 27, 28. At this time, source 33 is cyclicly energizing the primary windings 30, 30′ via the resistor 34. As the direction of the current in windings 30, 30′ reverses, the core flux is alternately driven in opposite magnetic directions as is indicated by the double ended arrows A, B. Each time that the core flux changes direction, a voltage is induced in the secondary or output windings 32, 32′. These induced voltages aid since the magnetic directions of the output windings 32, 32′ correspond to the magnetic directions of the primary windings. The rectifier 35 conducts only during the half-cycle when it is forwardly biased. The filter capacitor 36 integrates these half-cycles to provide a substantially steady state D.C. output signal.

Next, assume that the pulsing contacts 23 close so that current flows over the line 20 from the battery 22 to ground. As current flows through the control windings 31, 31′ the magnetic flux of the annular cores is driven in a single magnetic direction as indicated by the single ended arrows C, D. For the brief interval during which the core flux is driven to saturation by the transient of the line current in windings 31, 31′ virtually all energy applied across the control windings goes to change the core flux. However, immediately upon saturation, virtually none of this energy goes to change core flux and these windings 31, 31′ offer virtually no impedance to the flow of steady-state D.C. current on the line 20.

The source 33 continues to energize the primary windings 30, 30′ by periodically reversing current flow; however, the cores are held in magnetic saturation by the D.C. current in the control windings 31, 31′. Thus, there is virtually no change in core flux as a result of current in windings 30, 30′ After the core flux changes terminate, no further voltages are induced in the secondary windings 32, 32′ and the output current falls almost to zero. Any suitable device (not shown) connected to the "output" terminals responds to the presence or absence of the D.C. output voltage to indicate the presence or absence of line current.

Means are provided for minimizing electrical effects produced in the line current by the presence of the current sensing element. Thus the line is not appreciably disturbed by the presence of the element. This is particularly important on voice lines where the frequency response and other transmission characteristics of the voice line would be changed by the presence of a relay winding or other similar device. More particularly, as the source 33 drives core flux in a first direction, clockwise, for example, a flux change occurs in the core and a voltage is induced in the control windings. The voltages thus induced in the two control windings 31, 31′ oppose. This, in turn, provides bucking currents on the line 20 which tend to cancel each other and thus minimize the electrical effects caused in the line by the insertion of the module. During the next half-cycle, when source 33 drives core flux counterclockwise, oppositely directed currents are induced in windings 31, 31′, which again buck out on the line.

The general nature of the principal components of the embodiment of FIG. 2 (i.e., a monitored line 20′ having pulsing contacts 23′ and a current sensing element 21′) will be readily apparent from the foregoing description of FIG. 1. Primarily, FIG. 2 differs from FIG. 1 by the inclusion of a saturable reactor having a unitary multi-leg core 50. A first or central leg 51 on the core includes a control winding 52 series connected in the D.C. wire line 20′. The other two core legs 53, 54 have wound on them a pair of magnetically aiding windings 55, 56. In series circuit with these windings 55, 56 is the primary winding 57 of an output transformer, a resistance 58, and a source 33′. The reactor windings 55, 56 are connected in a magnetically aiding series. The resistance 58 limits current and provides a large voltage drop when the reactor core is saturated. The source 33′ provides cyclically reversing current. Here, however, the output signal is taken from the secondary winding 60 of the output transformer. The rectifier 35′ and filter capacitor 36′ are the same as those described in connection with FIG. 1.

The circuit of FIG. 2 operates in the following manner. First, assume that the pulsing contacts 23′ are open so that no D.C. current flows on the line. No current flows through the control winding 52 on the center leg 51 of the reactor core; therefore, no core flux change occurs in the center leg. Hence, as the source 33′ energizes the windings 55, 56 in the series circuit, the core flux alternately changes direction as indicated by the double ended arrows E, F. Thus, most of the source voltage appears across windings 55, 56 and very little voltage is available across winding 57. Since little voltage is induced in the secondary winding 60 of the output transformer, there is little D.C. output signal.

When the pulsing contacts 23′ close and D.C. current flows through the control winding 52, magnetic flux travels in a unitary direction through the center leg 51 of the core (as indicated by arrows G), divides, and flows through each of the outer legs 55, 56. Since this flux does not change direction, some portion of the core immediately saturates, assuming an adequate ampere-turn for winding 52. This is, of course, the same as saturating the entire core.

During each half-cycle in the current from source 33′, a magnetomotive force is applied to the core, and a unidirectional flux traverses around the outer magnetic circuit including outer legs 53, 54. This unidirectional flux reverses direction on the next half-cycle. At any given instant, this magnetic flux adds to the control winding flux in one outer leg and subtracts from the control winding flux in the other outer leg. However, the core remains saturated in the leg where the A.C. flux and the D.C. flux add. Stated another way, the presence of the D.C. flux represented by arrow G and caused by line current reduces the permeability of the whole core so that the impedance of windings 55, 56 drops.

After the core saturates, virtually none of the source 33′ voltage appears across windings 55, 56 and virtually all source voltage appears across winding 57 of the output transformer. This, in turn, induces a relatively large voltage in the secondary winding 60 and produces a relatively great output current flow. Contrast this with the magnetic effects when the pulsing contacts 23′ are open. Then, virtually all of the source 33′ voltage appears across winding 55, 56 and a relatively small voltage appears across the primary winding 57 of the output transformer. The resulting voltage induced in secondary winding 60 provides an extremely small output current flow. Thus, instruments connected to the "*output*" terminals indicate whether contacts 23′ are opened or closed.

An advantage of the circuitry of FIG. 2 is that after the D.C. line current flow saturates the core 50, very little, if any, electrical effect is felt in the line 20 due to the presence of the control winding 52. That is, the source energy add and subtract magnetomotive forces in the outer legs of the reactor core. Therefore, the direct current produced magnetomotive forces in outer legs 53, 54 increase and decrease by like amounts. Thus the total unidirectional flux in the center leg 51 does not change as a result of source current. In this manner, virtually no voltages are induced in the center winding 52 as a result of the source 33′ current.

For convenience of description the foregoing has referred to saturation of the various cores. However, as those skilled in the art will perceive, "saturation" is a matter of degree. The invention depends upon the change in winding impedance which occurs responsive to the amount of D.C. flux, and this in turn depends upon the change in line current. Hence, the term "saturation" should be read to cover many degrees of saturation.

In either embodiment of the invention, a bias winding may be added to generate a small D.C. bias flux in the core. This flux may aid flux produced by line current flowing in one direction and oppose flux produced by line current flowing in an opposite direction. Thus, the output of the monitors may indicate the direction or magnitude of line current flow.

Another advantage of either embodiment of the invention is that transients on the line circuit will have substantially no effect on the results obtained by the monitoring circuit, that is because the steady state D.C. is sufficient to saturate the core and the inductive circuit has a differentiating effect. It should be noted that the monitor circuits embodying this invention can be extremely sensitive because the flux generated by the line current can be adjusted to be sufficient to saturate the core regardless of the amplitude of the current.

In the embodiment of FIG. 2, the addition of a shorted winding on the center leg 51 may further improve operation in some applications. This is because there is less inductive reactance for D.C. control winding 52.

It is to be understood that the foregoing description of a specific example of the invention is not to be considered as a limitation on its scope.

We claim:

1. A monitor device comprising a communication line for transmitting undulating currents representing a voice message, signal means for applying a direct current to said line, at least one set of data transmitting pulsing contacts for selectively applying and removing said direct current to or from said line depending upon whether said contacts are closed or open, monitor means for detecting the direct current on said line without affecting the undulating current on said line, said monitor means comprising a current sensing circuit inductively coupled to said line at a point on said line where said direct current appears on or is removed from said line by said pulsing contacts, means responsive to current flow over said line for effectively changing the impedance of a circuit controlled by said monitor means, and means responsive to said change of impedance for providing a signal indicating whether said contacts are opened or closed.

2. The device of claim 1 wherein said monitor means comprises means including said inductive coupling for effectively bucking electrical effects on said line caused by the presence of said monitor means.

3. The device of claim 1 wherein said monitor means comprises means including at least one saturable reactor having at least one winding coupled in series with said line, said winding having a number of ampere turns sufficient for substantially saturating the core of said reactor when said current on said line exceeds a predetermined value, circuit means including at least two other series aiding windings on the saturable reactor for generating alternately reversing flux in said core, and said signal indicating means comprises means responsive to impedance changes in said series aiding windings for giving an output signal indicating whether said line current exceeds said predetermined value.

4. A monitor device comprising a communication line for transmitting undulating currents representing a voice message, signal means for applying a direct current to said line including at least one set of data transmitting pulsing contacts for selectively applying and removing said direct current to or from said line depending upon whether said contacts are closed or open, monitor means comprising a current sensing circuit inductively coupled to said line at a point on said line where said direct current appears on or is removed from said line by said pulsing contacts, said monitor means comprising a pair of saturable reactors for detecting the direct current on said line without affecting the undulating current on said line, each reactor having primary, control, and secondary windings thereon, said control windings being connected in series with said line and having bucking effects to cancel reaction in said line current to flux changes in said reactor, means including said primary windings for cyclically and simultaneously reversing magnetic flux of said reactors to induce a signal in said secondary windings, said appearance of said direct current on said line energizing said control windings to saturate both said reactors, said saturation of said reactor substantially decreasing signals induced in said secondary windings thereby effectively changing the impedance of a circuit controlled by said monitor means whereby an effective output current appears in said secondary windings when said magnetic flux reverses only if said reactors are not saturated, and means responsive to said output current for providing a signal indicating whether said contacts are opened or closed.

References Cited by the Examiner

UNITED STATES PATENTS

| | | | |
|---|---|---|---|
| 1,986,112 | 1/35 | Logan | 340—253 XR |
| 2,719,288 | 9/55 | Young | 340—253 XR |
| 3,002,184 | 9/61 | Proebster | 340—174 |
| 3,008,054 | 11/61 | Saltz | 307—88 |

NEIL C. READ, *Primary Examiner.*

ROBERT H. ROSE, *Examiner.*